May 12, 1931.  L. C. BLOMSTROM  1,805,232
MEANS FOR HOLDING HALF BEARINGS ABOUT
AN ARBOR PREPARATORY TO MACHINING
Filed Aug. 6, 1927
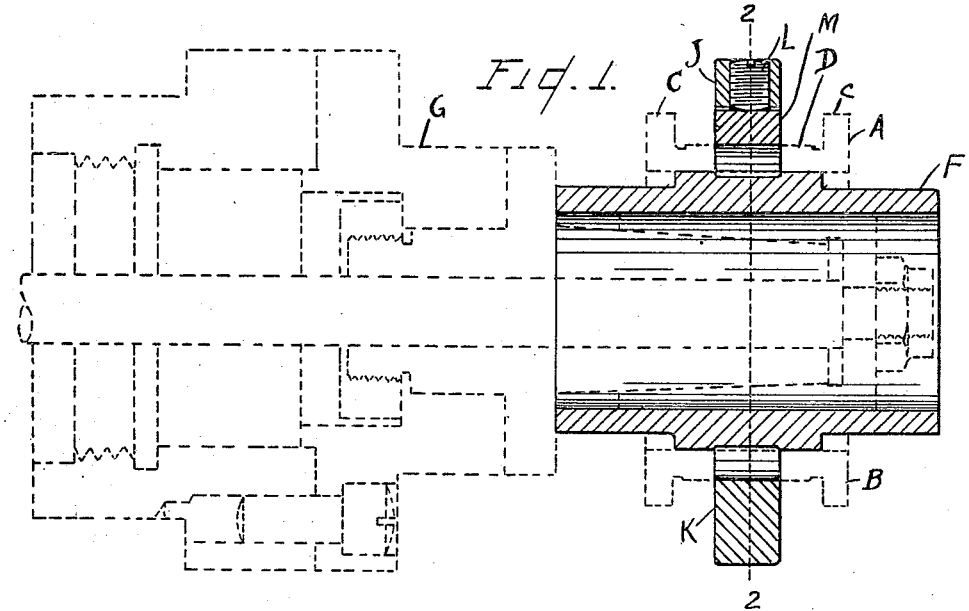
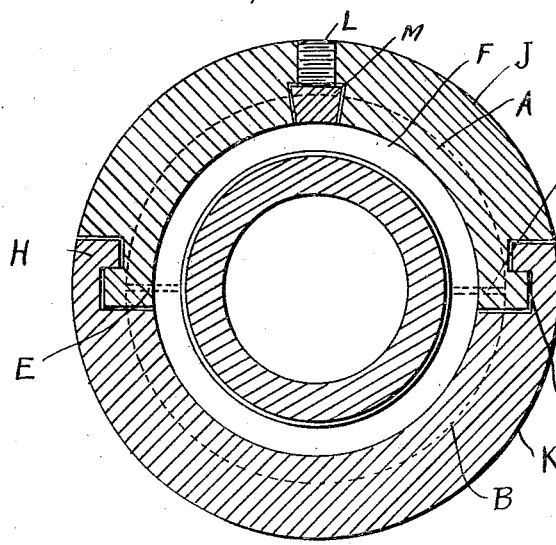
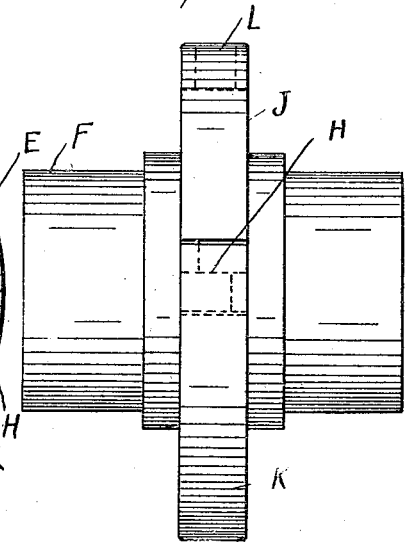
Lowell C. Blomstrom
INVENTOR
BY
Swan Frye and Murray
ATTORNEYS Patented May 12, 1931

1,805,232

UNITED STATES PATENT OFFICE

LOWELL C. BLOMSTROM, OF DETROIT, MICHIGAN, ASSIGNOR TO FEDERAL MOGUL CORPORATION, OF DETROIT, MICHIGAN, A CORPORATION OF MICHIGAN

MEANS FOR HOLDING HALF BEARINGS ABOUT AN ARBOR PREPARATORY TO MACHINING

Application filed August 6, 1927. Serial No. 211,085.

This invention relates to improved means and methods for mounting half bearings upon arbors or dummies in position for certain machining operations, and has for its object an improved organization of parts by means of which this can be accomplished relatively rapidly and with not specially trained help, while preserving the accuracy of assemblage necessary for securing properly close results after the machining operation has been completed. Of course the half bearings might be held either manually or by some mechanical arrangement, for machining singly, that is, where the operation of a cutting tool only extends through a half circle or 180°, but this would be uneconomical in the matter of time and equipment, and it has been my experience that from the standpoint of accuracy of results, it is far less desirable than the contemporary, and to a degree conjoint, machining of two half bearings, temporarily encircling an arbor or similar holding member.

In the drawings;

Figure 1 is an elevational view of a lathe spindle or similar mechanism, the usual parts thereof being shown in dotted lines, with a temporary arbor or dummy carrying my improved shell-holding device, shown in full lines therein.

Figure 2 is a cross-sectional view taken along the line 2—2 of Figure 1.

Figure 3 is an elevational view taken from the same position as the right hand end of Figure 1, and indeed is in many respects a full elevational view as contrasted with the sectional representation there given.

While I do not desire to be understood as restricting the disclosure herein made to half bearings which are flanged at their end portions, I will, for convenience and simplicity of description, confine the specific explanations herein made to that type, which, as brought out at A and B in dotted lines in Figure 1, and in sectioned full lines in Figure 2, have terminal flanges C at either end of the intermediate web D. Each half bearing or individual shell may represent a full 180° of curvature, or, as brought out at E in Figure 2, the adjacent straight edges of the two bearings as positioned about the arbor or dummy F may be slightly spaced from one another. This is to allow for subsequent corrective curvature and machining of each half-bearing in a process step not here involved. The disclosures herein made are applicable to either full half-bearings or to slightly less than half-bearings. In either type it is desirable that two half bearings at a time be held in adequately rigid position about a dummy or arbor F, while the necessary machining of the selected part of the periphery of each bearing shell is in progress. To all intents and purposes these should be so firmly held and so accurately aligned as in the grinding operation to be capable of consideration and treatment as though the two halves were a full cylinder. On the other hand, quickness and ease of assemblage or disassemblage of the parts about their arbor, and reliable accuracy from unit to unit as each is mounted upon the spindle G of the lathe or grinding apparatus, is essential. And a further requirement of the means adopted for holding the parts in position is that it be out of the way of the range of cut of the machine tool designed to work upon the bearing shells. These requirements and operative considerations I meet by positioning about the bearing shells A and B as they are positioned about the arbor F, two halves, as J and K, of a split ring, provided with interlocking portions as H at their meeting ends. Especially in the case of flanged half bearings, not only would a plain unbroken ring of accurate diametrical measurement be impossible of use about the central web portion D, but some forms of plurally pieced rings could not be fitted together acceptably and in a way to hold the two bearing shells in proper relation for machining. The interlocking of the complementary ends H of the half rings J and K is accomplished by first positioning each interiorly of the flanges C of the bearing shells, that is, somewhere along the intermediate web D, though primarily not in alignment with one another, and then moving them toward one another until the interlocking ends adequately engage, placing the two pieces of the ring in the same plane, perpendicular to the axis of the arbor F. While the parts are in this position, it is desirable to effect their absolute locking relatively to the bearing shell and in turn to the arbor by some such means as the screw L, which may operate either directly against the surface of the bearing shell, or cushioningly through the interposed wedge or keystone M contained in the body of one of the half ring pieces. In some cases the axial length of the bearing is such that the length of the web D between the flanges C is more than ample to accommodate the relative movement of the parts of the holding ring herein described. But in other cases the length of the web D exceeds twice the thickness of either of the encircling rings as assembled by such a small margin that but little except interlocking movement of one relatively to the other is possible.

With the parts thus assembled and interlocked, each arbor and its supported bearing shells and their holding ring pieces may, as soon as assembled, be placed in a crate or storage hamper for movement in bulk as required to a position adjacent the lathe or other shop machine which is to act upon the half-bearings, and when there they may be conveniently removed in quick succession by the operator for mounting upon the spindle G, and, when the machining operation is completed, storage in another receptacle for subsequent disassemblage, the now machined bearing shells being one step further toward shipment, and the disassembled half rings and the arbors being ready for re-use with similar half bearing shells in the manner already described.

It will be obvious from the foregoing that as regards the interrelation of the parts above described, the dummy or arbor F is in reality a convenient, high-speed substitute for the arbor of the lathe which is to support the half bearings during the machining operation; in other words, that in operation, though at the expense of stopping the apparatus after each pair of half-bearings has been machined, the lathe arbor would function exactly as the dummy herein described. But by the use of such a member and by previous assemblage of a number of these with their half bearings, much greater speed of operation is attainable.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. Means for holding a pair of half-bearings in position about a supporting element for machining operations upon selected portions of their peripheral, comprising in combination therewith a two-piece ring having interlockable portions adapted to be united about the intermediate portions of the half bearings after the latter have been placed in position about the supporting element, and a screw carried by one of said ring sections, adapted to be moved transversely of the lengthwise axis of the supporting element and of the assembled half-bearings into frictional engagement with the outer surface of one of the half-bearings.

2. Means for holding a pair of half-bearings with their straight edge portions temporarily adjacent one another, comprising in combination with a supporting arbor a two-piece ring the interlocking end portions of which are adapted to be moved into engagement with one another by movement of one ring section relatively to the other ring section lengthwise of the temporary cylindrical structure formed by the half-bearings, and means carried by one of said ring sections and adapted to be moved into frictional relation with the adjacent outer surface of one of the half-bearings whereby the then correlated ring sections are moved slightly out of their initial position of coaxiality with respect to said arbor and are held against disengagement from one another and from the encircled half-bearings.

3. Means for holding a pair of plurally flanged half-bearings in temporary cylindrical relation, comprising in combination with a supporting arbor a two-piece ring adapted to have its complementarily formed end portions brought into interlocking engagement about the web portions of the bearings between the flanges by relative movement toward one another along a line parallel to the lengthwise axis of the cylindrical structure temporarily formed by the half-bearings, and means carried by one of said ring sections and adapted to be brought into frictional engagement with the adjacent one of the half-bearings whereby said ring sections are held in desired relation to one another and to said half-bearings.

4. Means for correlating successive pairs of half-bearing shells in circumferential coincidence relatively to the planes of their external surface, comprising, in combination, a supporting arbor, detachable ring sections having terminally interlockable end portions adapted to closely engage, when structurally assembled, about peripheral portions of the pair of half-bearing shells under treatment, and means carried by one of said ring sections and adapted to be forced into temporary operative engagement with the adjacent peripheral portion of one of the half-bearing shells whereby the ring sections are drawn into tightly encircling position about the half-bearing shells.

5. In combination with a supporting arbor of substantially the same peripheral contour as the concave surfaces of half-bearing shells, which it is desired to position thereon in pairs, an encircling ring member having substantially the same convex surface curvature as the outer convexed surfaces of the half-bearing shells whose temporary anchorage about said arbor is desired, said ring member being formed in two terminally interlockable sections, and means carried by one of said ring sections and adapted to be operatively forced against the adjacent outer surface of one of said half-bearing sections, whereby the latter are undisplaceably held in truly cylindrical relation about the arbor by the centripetal pressure thereon of one or the other one of the ring sections.

6. The combination, with a two-piece ring formed of terminally interlockable separable pieces, of a screw member adjustably engaging through one of said pieces transversely of the cylindrical axis of said ring when assembled, said screw member when projected against a mass encircled by said ring being adapted to exert a separating influence on the parts thereof which is resisted by the interlocked position of the ends of the component parts thereof, thereby effecting a holding action by the ring structure as a whole upon a pair of half-bearing shells surrounded thereby, and an arbor member positioned coaxially within said half-bearing shells, against whose surface the half-bearing shells are adapted to be pressed by the described action of said ring structure.

7. The combination, with a two-piece ring having its meeting end portions formed for the effectuation of a structural interlock between, and disassemblage of, the constituent parts by relative movement thereof lengthwise of the axis of the ring, of means carried by one of the ring sections and adapted to be moved into frictional engagement with an article of corresponding size and peripheral contour about which said ring sections are positioned, whereby the other section of the ring from that whereon said last mentioned means is carried is drawn into close frictional engagement with the adjacent surface of the enclosed article and whereby the interlocked end sections of the ring pieces are held against disassembling movement.

8. In combination with a supporting arbor member about which a pair of half bearing shells are adapted to be positioned, means for effecting the temporary holding of such shells in firm and unitedly circular relation thereabout, comprising a pair of substantially semicircular shell-surrounding members provided with interlockable ends which are capable of structural union and disassemblage only when moved toward or away from one another in directions parallel with the axis of the arbor and of its supported bearing shells, and means carried by one of said shell-surrounding members and adapted to be projected against the adjacent outer surface of one or the other of the bearing shells whereby the enclosing structure of semicircular members is drawn into close frictional engagement with the surface of said bearing shells.

In testimony whereof, I sign this specification.

LOWELL C. BLOMSTROM.